Figure 1:
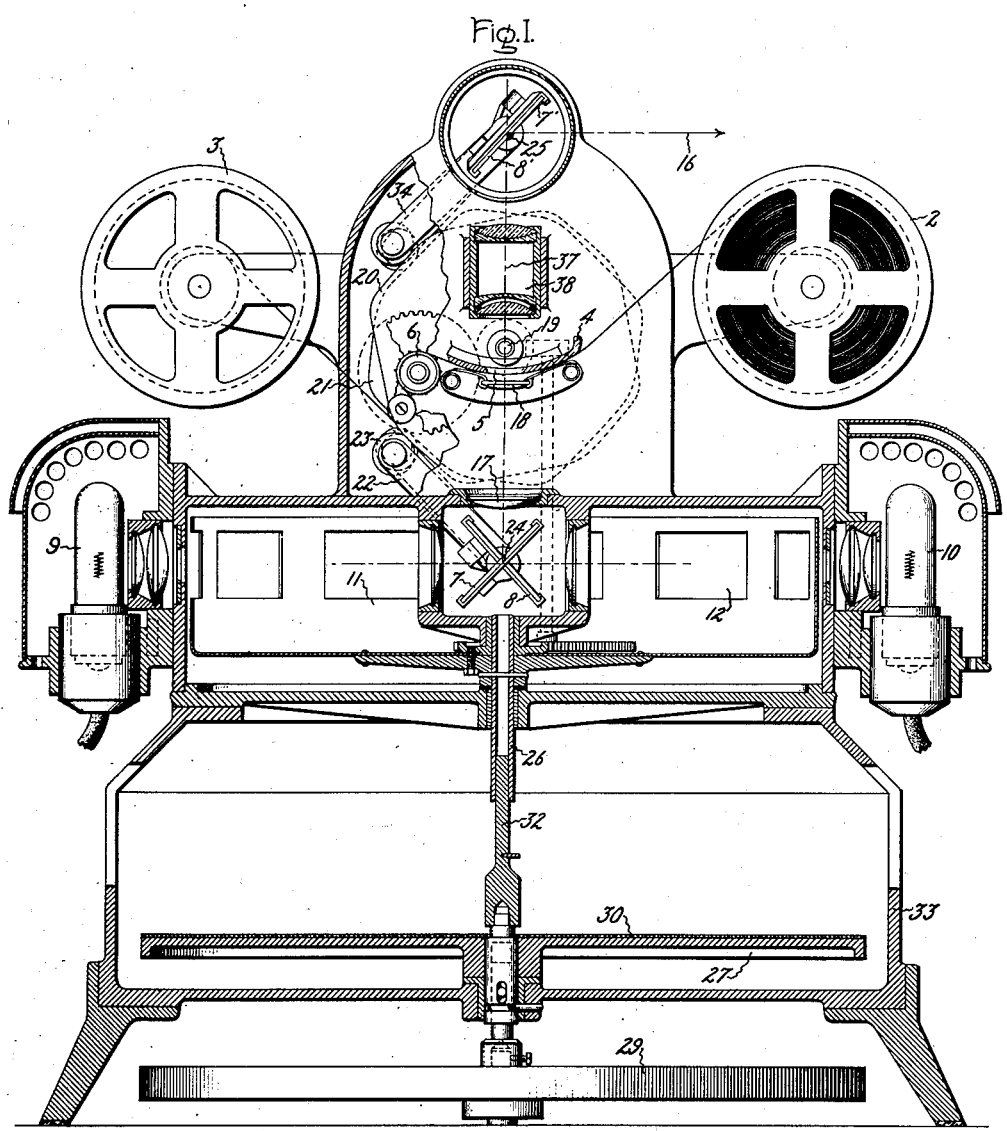

Jan. 3, 1933. E. MECHAU 1,893,374
MOTION PICTURE PROJECTOR
Filed Oct. 8, 1931 2 Sheets-Sheet 1

Inventor:
Emil Mechau,
by Charles E. Mullow
His Attorney.

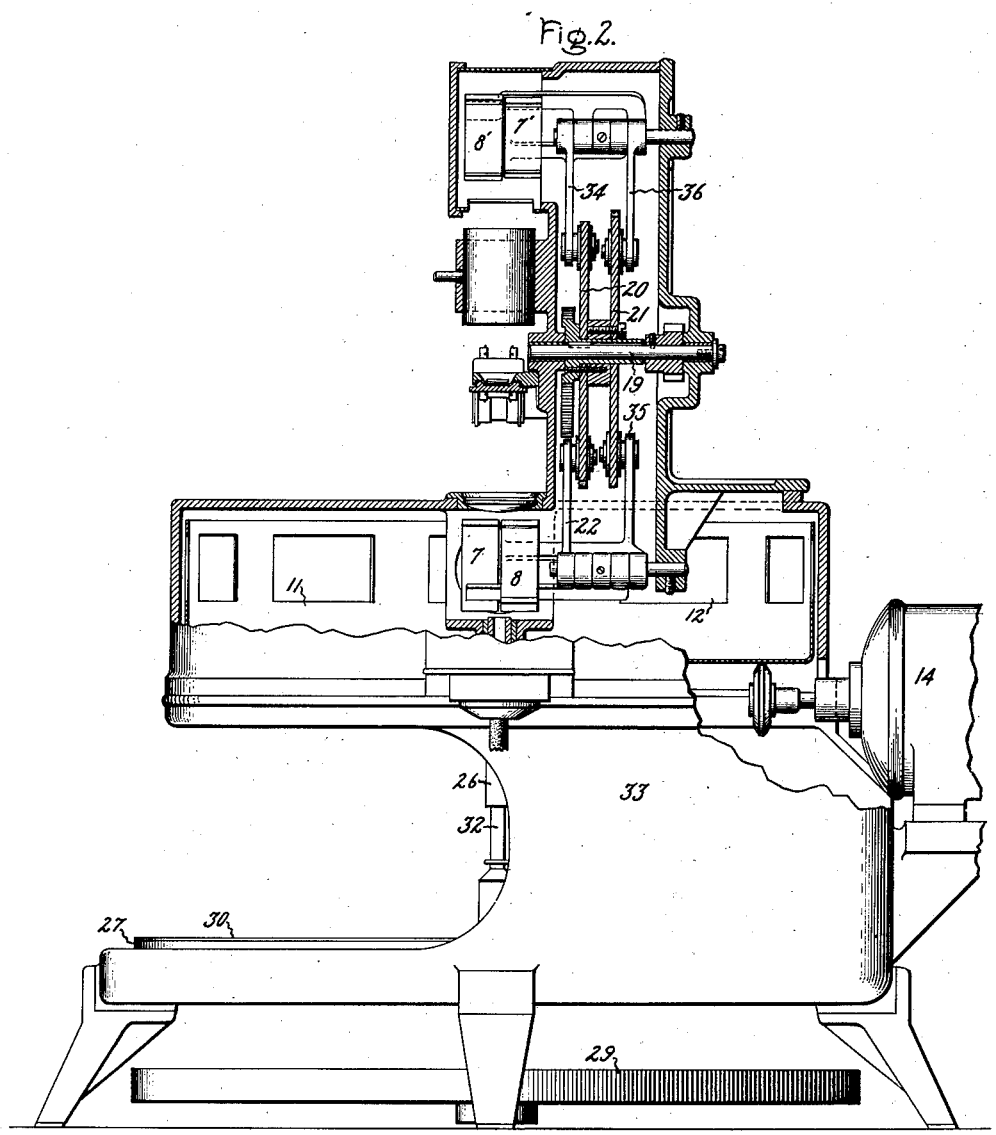

Patented Jan. 3, 1933

1,893,374

UNITED STATES PATENT OFFICE

EMIL MECHAU, OF BERLIN-SUDENDE, GERMANY, ASSIGNOR TO GENERAL ELECTRIC COMPANY, A CORPORATION OF NEW YORK

MOTION PICTURE PROJECTOR

Application filed October 8, 1931, Serial No. 567,727, and in Germany October 9, 1930.

My invention relates to motion picture projectors of the type through which the film moves with a continuous steady motion. It is the object of my invention to provide an improved projector of this type which is simple in construction and is quiet and efficient in operation.

My invention will be better understood from the following description taken in connection with the accompanying drawings, and its scope will be pointed out in the appended claims.

Referring to the drawings, Figs. 1 and 2 show cross sectional views taken respectively at right angles to each other illustrating one embodiment of my invention.

In the drawings the film is shown passing from the reel 2 to the reel 3 over the film support 4 which is curved or arched and which contains the framing opening 5, which opening may, for example, be equal to two and one-half pictures. The film is drawn over the support 4 by means of the sprocket 6. Behind the film is the rocking mirror 7 for moving the light beam projected from the source 9. At one side of the mirror 7 is another similar rocking mirror 8 which reflects light from the other source 10. Mirrors 7 and 8 are arranged to reflect light respectively from the sources 9 and 10 through the framing opening 5. Rocking mirror 7 behind the film cooperates with rocking mirror 7' arranged in front of the film to compensate for the movement of the film while mirror 8 behind the film is similarly arranged to cooperate with rocking mirror 8' in front of the film. Rocking mirrors 7 and 7' effect the reproduction of one film picture and rocking mirrors 8 and 8' that of the next picture. As shown in Fig. 2 the rocking mirrors are arranged symmetrically with respect to the optical axis 37 of the objective 38, and the optically cooperating rocking mirrors are located on opposite sides of the optical axis. Rocking mirror pairs 7, 7' and 8, 8' act alternately, each serving for the reproduction of one of two successive pictures. A rotating screen or shutter 11 having opening 12 operates to admit light to the mirrors 7 and 8 when they move in one direction and to cut off the light when they move in the opposite direction. The shutter 11 is arranged to be driven by motor 14 which through suitable gearing drives the film and the cam discs to be described later. Shaft 26 is driven by the rotating shutter 11.

The two pairs of mirrors 7, 7' and 8, 8' which to a certain extent operate as separate projectors with different light beams throw an image in the direction of arrow 16 of successive pictures on the same point of the projection screen. Between the framing opening 5 and the rocking mirrors 7 and 8 lens 17 is arranged to concentrate the light coming from the mirror onto the framing opening. Another lens 18 is provided close to the framing opening 5. An important feature of the above construction is that the common axis of mirrors 7 and 8 intersects optical axis 37 at a point which is conjugate with the point of intersection of the optical axis and the common axis of mirrors 7' and 8'.

By means of the construction of the rocking mirrors described above the result is obtained that during the change from the projection of a picture by one pair of rocking mirrors, for example, 7, 7' to the projection of the next picture by the other pair of rocking mirrors, in other words, during time that the light beams of both pairs of mirrors are partially active so that a superposition takes place, the last of each beam of light will only pass the corresponding pair of rocking mirrors and that by each front rocking mirror only the rocking mirror that belongs to it behind the film is lighted. For controlling the rocking motion of the several mirrors I have provided the cam 20 and the cam 21 which cams are mounted on the shaft 19. Each cam controls the rocking motion of one rocking mirror in front of the film and that of the corresponding rocking mirror behind the film. Cam 20, for example, controls the rocking motion of mirrors 7, 7' while cam 21 controls the rocking motion of mirrors 8, 8'. Mirror 7 is connected with the mirror arm 22 the roller 23 of which engages cam 20. The roller of mirror arm 34 is guided by the cam 20. Mirrors 8 and 8' are connected with the mirror arms 35 and 36 respectively, the rollers of which are guided by cam 21. The rocking mirrors 7, 8 behind the film, and the corresponding rocking mirrors 7′, 8′ in front of the film are located on different sides of the optical axis although they are operated by a mutual cam. The cam shaft 19 is arranged between the axes of the rocking mirrors and preferably placed in the line which connects the axes 24 and 25 of the rocking mirrors at a point which is midway between these axes. The two cams 20 and 21 which are mounted on shaft 19 cooperate in such a way that one pair of rocking mirrors 8, 8′ is returned to its original position while the other pair of rocking mirrors 7, 7′ reproduces the picture. Afterwards the rocking mirrors 8, 8′ reproduces the next picture, etc. The projection of light on the mirrors 7 and 8 is controlled by the rotating shutter 11 in such a way that the mirrors which are being returned do not receive any light. The projector which I have devised is also adapted for the reproduction of sound motion pictures. For sound reproduction I have provided the turntable 27 arranged beneath the picture projector and upon which the sound record 30 may be placed. For applying or removing the sound record disc the shaft 32 is adapted to be slipped upward in shaft 26. To effect more uniform motion of the turntable 27 I have provided the flywheel 29 connected therewith. The picture projector and the sound reproducing apparatus are mounted in the common frame 33.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States, is:

1. A motion picture projector comprising a film support, an objective in front of the support, a plurality of rocking mirrors having a common fixed axis upon which they rock arranged in front of the support and symmetrically on opposite sides of the optical axis of said objective laterally of the film and a plurality of rocking mirrors having a common axis arranged behind the support and symmetrically on opposite sides of said optical axis.

2. A motion picture projector comprising a film support, an objective in front thereof, mirrors mounted to rock on fixed axes and arranged laterally of the film in front of and behind said support, a plurality of light sources and means for directing light from said sources alternately on the respective mirrors behind the support.

3. A motion picture projector comprising a film support, an objective in front thereof, mirrors mounted to rock on a common fixed axis and arranged laterally of the film in front of said support, a plurality of mirrors mounted to rock on a common fixed axis and arranged laterally of the film behind said support, a plurality of light sources each arranged to direct light on one of the rocking mirrors behind the support and a rotatable shutter for alterately intercepting light from said sources.

In witness whereof, I have hereunto set my hand.

EMIL MECHAU.